United States Patent Office 3,459,801
Patented Aug. 5, 1969

3,459,801
PROCESS FOR THE MANUFACTURE OF MONO-HALOGENO-N-ALKYL-ACETOACETAMIDES
Ernst Beriger, Allschwil, Switzerland, assignor to Ciba Limited, Basel, Switzerland, a company of Switzerland
No Drawing. Filed Jan. 31, 1967, Ser. No. 612,804
Claims priority, application Switzerland, Feb. 15, 1966, 2,169/66
Int. Cl. C07c 103/02, 103/12
U.S. Cl. 260—561                    2 Claims

ABSTRACT OF THE DISCLOSURE

A process for the manufacture of a compound of the formula

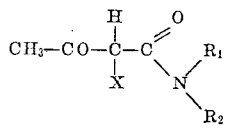

in which X represents a member selected from the group consisting of chlorine, bromine and iodine, $R_1$ represents a member selected from the group consisting of lower alkyl, lower alkoxyalkyl and benzyl and $R_2$ represents a member selected from the group consisting of hydrogen, lower alkyl, lower alkoxyalkyl and benzyl, which process comprises replacing one of the radicals X in a compound of the formula

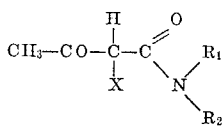

in which X, $R_1$ and $R_2$ have the significance given above, by hydrogen, by means of selective hydrogenolysis.

---

The present invention provides a process for the manufacture of a compound of general formula

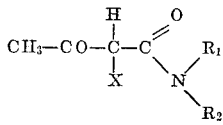

in which X represents chlorine, bromine or iodine, $R_1$ represents an alkyl residue which may be substituted by at least one halogen atom or may be interrupted by at least one oxygen or sulphur atom, or represents an aralkyl residue, and $R_2$ represents hydrogen or one of the residues specified for $R_1$, which process comprises replacing one of the residues X in a compound of general formula

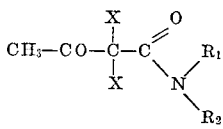

in which X, $R_1$ and $R_2$ have the significance given above, by hydrogen, by means of selective hydrogenolysis.

The present invention is especially concerned with a process for the manufacture of a compound of general formula

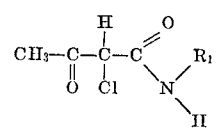

in which $R_1$ has the significance given above, which comprise replacing one of the chlorine atoms by hydrogen in a compound of general formula

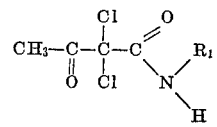

in which $R_1$ has the significance given above, by reaction of the compound with one equivalent of hydrogen, in the presence of a hydrogenation catalyst.

The hydrogenation may be carried out in the usual manner with gaseous hydrogen, in the presence of a hydrogenation catalyst, at normal or at raised pressure and normal or at raised temperatures. It has proved particularly suitable to use, as the hydrogenation catalyst, palladium on activated charcoal, preferably 5% by weight of palladium based on the total weight of the palladium charcoal. It is appropriate to dissolve the starting material which is to be hydrogenated in glacial acetic acid, and to add to the solution an acid-bonding substance for example, sodium acetate.

The manufacture of α-halogeno-N-alkylamino-acetoacetamides is particularly difficult. The known methods of manufacture in which the N-alkylamino-acetoacetamide is partially halogenated, only give inadequate yields and products consisting of more than one substance. Thus, for example, according to Dutch patent specification 6,500,702 N-methyl-acetoacetamide is partially chlorinated with sulphuryl chloride. However on carrying out this process, only 70% by weight of a mixture consisting of approximately 70% by weight of the monochlorinated final product, approximately 22% by weight of the dichlorinated by-products and approximately 6% by weight of the unchlorinated starting material are obtained. The isolation of the desired monochlorinated compound by crystallisation is very difficult, and is only possible with a major effort, and is practically impossible by distillation.

The facts which have been qouted show the surprising technical adavnce of the process of the invention.

The present invention relates especially to the manufacture of the compound of formula

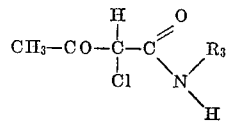

by partial hydrogenolysis of α,α-dichloro-N-methyl-acetoacetamide in the manner explained above, also to the analogous manufacture of a compound of formula

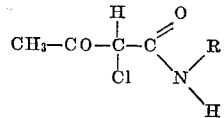

in which R denotes an alkoxyalkyl residue which is preferably a lower alkoxyalkyl residue, especially the methoxyethyl or methoxypropyl residue.

The compounds manufactured by the process of the invention have considerable technical importance as intermediates, for example, in the manufacture of pesticides.

The following example illustrates the invention. The parts denote parts by weight, the percentages are by weight and the temperatures are given in degrees centigrade.

Example (a) 37 parts (0.2 mol) of α,α-dichloracetoacetic acid monomethylamide (melting point 65°) manufactured by chlorination of acetoacetic acid monomethylamide in chloroform solution with 2 mols of sulphuryl chloride, are dissolved in 400 parts by volume of glacial acetic acid together with 36 parts of sodium acetate. The hydrogenation with hydrogen is carried out in the solution, in the presence of 2 parts of palladium charcoal (5%) at normal pressure and room temperature, until 0.2 mol of hydrogen is absorbed. The catalyst is filtered off, the glacial acetic acid is removed in vacuo, the residue is dissolved in methylene chloride, and the solution is washed with a little water. After evaporating off the solvent in vacuo, 30 parts of crystalline α-monochloracetoacetic acid monomethylamide of the following composition are obtained as the residue:

|  | Percent |
|---|---|
| α-Monochloracetoacetic acid monomethylamide | 89.6 |
| α,α-Dichloracetoacetic acid monomethylamide | 5.1 |
| Acetoacetic acid monomethylamide | 2.8 |

(b) 24.2 parts of α-dichloracetoacetic acid methoxypropylamide are dissolved in a solution of 18 parts of sodium acetate in 200 parts by volume of glacial acetic acid and are hydrogenated with a little palladium-charcoal (containing 5% by weight of palladium) at 20–30°, and at normal pressure. After 0.1 mol of hydrogen has been absorbed, the solution is filtered and reduced in volume by evaporation. The residue is dissolved in 200 parts by volume of methylene chloride, the insoluble salts are filtered off, and the filtrate is evaporated in vacuo at a slightly raised temperature. 21 parts of α-monochloracetoacetic acid methoxypropylamide are obtained as the residue.

Analysis for $C_8H_{14}ClNO_3$: Found, Cl, 17.1%. Calculated, Cl, 17.07%.

(c) Analogously, 21.2 parts of α-dichloracetoacetic acid isopropylamide in glacial acetic acid are dehalogenated using palladium-charcoal/hydrogen, to give α-monochloroacetoacetic acid isopropylamide (17 parts). The product may be recrystalised from benzene-cyclohexane and has a melting point of 80°.

Analysis for $C_7H_{12}ClNO_2$: Found, N, 7.5%, Cl, 19.8%. Calculated, N, 7.9%, Cl, 19.9%.

(d) Analogously, 22 parts of α-monochloracetoactic acid benzylamide are obtained from 26 parts of α-dichloracetoacetic acid benzylamide by partial hydrogenation with palladium-charcoal/hydrogen in glacial acetic acid-sodium acetate; when recrystallised from cyclohexane, the product melts at 64–65°.

Analysis for $C_{11}H_{10}ClNO_2$: Found, N, 6.2%, Cl, 15.6%. Calculated, N, 6.3%, Cl, 15.8%.

What is claimed is:
1. A process for the manufacture of a compound of the formula

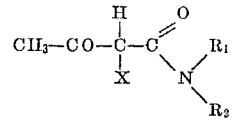

in which X represents a member selected from the group consisting of chlorine, bromine and iodine, $R_1$ represents a member selected from the group consisting of lower alkyl, lower alkoxy lower alkyl, and benzyl and $R_2$ represents a member selected from the group consisting of hydrogen, lower alkyl, lower alkoxy lower alkyl, and benzyl, which process comprises replacing one of the radicals X in a compound of the formula

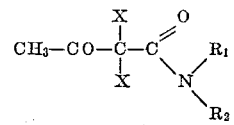

in which X, $R_1$ and $R_2$ have the significance given above, by hydrogen, by means of selective hydrogenolysis in the presence of palladium on activated charcoal.

2. A process as claimed in claim 1, wherein the compound of the formula

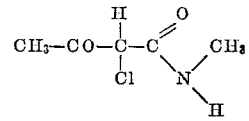

is prepared by replacing one of the chlorine atoms by hydrogen in the compound of the formula

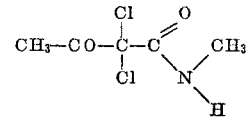

by reaction of the compound with one equivalent of hydrogen in the presence of palladium on activated charcoal.

References Cited

UNITED STATES PATENTS 3,358,023   12/1967   Birtwistle et al. _____ 260—561

ALEX MAZEL, Primary Examiner

J. A. NARCAVAGE, Assistant Examiner